United States Patent [19]
Van Der Lely

[11] 3,837,157
[45] Sept. 24, 1974

[54] DEVICES FOR PICKING UP MATERIAL LYING ON THE GROUND

[76] Inventor: Cornelis Van Der Lely, 7 Bruschenrain, Zug, Switzerland

[22] Filed: Dec. 26, 1972

[21] Appl. No.: 318,245

[30] Foreign Application Priority Data
Dec. 27, 1971 Netherlands.................... 7117853

[52] U.S. Cl............... 56/14.5, 15/83, 15/87, 56/16.9, 56/202, 56/364
[51] Int. Cl............................................. A01d 35/26
[58] Field of Search ............ 56/202, 255, 341, 14.5, 56/16.9, 364; 15/79, 82–87; 100/233, 250

[56] References Cited
UNITED STATES PATENTS

| | | | |
|---|---|---|---|
| 2,657,408 | 11/1953 | Machovec.......................... | 15/87 X |
| 2,789,067 | 4/1957 | Link, Jr. .............................. | 15/83 X |
| 2,909,887 | 10/1959 | Claas .................................. | 56/341 |
| 2,964,896 | 12/1960 | Finocchiaro...................... | 15/83 X |
| 3,087,297 | 4/1963 | Chace................................. | 56/202 |
| 3,173,777 | 3/1965 | Tamny................................ | 15/83 X |
| 3,186,021 | 6/1965 | Krier et al.......................... | 15/87 X |
| 3,242,658 | 3/1966 | Morales............................. | 56/202 X |

Primary Examiner—Russell R. Kinsey
Assistant Examiner—J. N. Eskovitz
Attorney, Agent, or Firm—Mason, Mason & Albright

[57] ABSTRACT

A device for picking up material lying on the ground includes a wheeled frame with brushes and/or mowing elements rotatably mounted below the frame to urge material rearwardly. A collecting trough is pivoted at its upper aspect to the device and movable from an operating collecting position to a discharge position. A channel communicates between a pick-up brush and the trough to extend the length of the brush, across the width of the frame to pass material back to the trough. An eccentric is connected to reciprocate a piston that forces the material into the trough through at least one movable flap. The eccentric is driven by a motor which also propels the device.

40 Claims, 8 Drawing Figures

PATENTED SEP 24 1974 3,837,157

DEVICES FOR PICKING UP MATERIAL LYING ON THE GROUND

According to the invention means are arranged between said member and the trough for pushing the material into the trough.

In this way the collecting capacity of the trough is considerably increased.

For a better understanding of the invention and to show how the same may be carried into effect, reference is made by way of example to the accompanying drawings.

Figure 1:
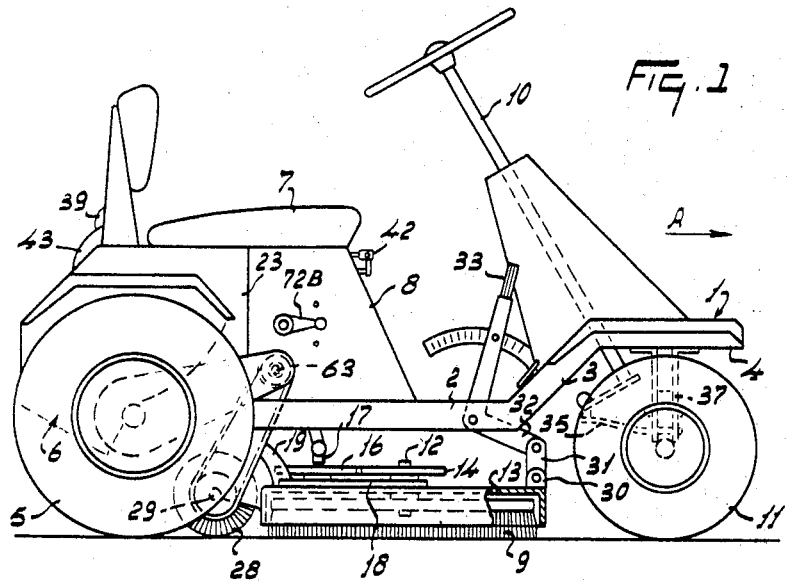
FIG. 1 is a side elevation of said device.

As shown in the side elevation of FIG. 1, the device comprises a frame 1 having a substantially horizontal portion 2, a portion 3 inclined upwardly, viewed in the direction of movement A, and a substantially horizontal end portion 4 joining the portion 3. The frame portion 2 comprises driven rear wheels 5, a collecting trough 6 for receiving the collected material, a driver seat 7, an engine having a driving mechanism 8 and brush elements 9 with a driving mechanism. The end portion 4 of the frame comprises the steering arrangement 10 and the front wheels 11.

The interconnected frame portions 2, 3 and 4 comprise each a floor plate stiffened at least at the side edges by downwardly bent-over stiffening rims.

The engine not shown in detail in the Figures may be a combustion engine or an electric motor fed from accumulators. The motor, arranged at least partly beneath the driver seat 7, has two downwardly extending outgoing shafts for driving the brush elements.

Between the front wheels 11 and the rear wheels 5, beneath the frame 2, brush elements are adapted to rotate each about a substantially vertical rotary shaft 12 in opposite directions. These rotary shafts 12 are arranged so that a horizontal line of connection between the shafts 12 extends transversely of the direction of movement A of the device. The brush elements 9 may be replaced by mowing elements and conversely. In operation the brush elements are arranged so that the brush hairs or wires can come into contact with the ground. If mowing elements are provided, the cutters thereof are rotating, in operation, at a small height above the ground. In both cases the elements are vertically adjustable and fixable in a plurality of positions.

Figure 2:
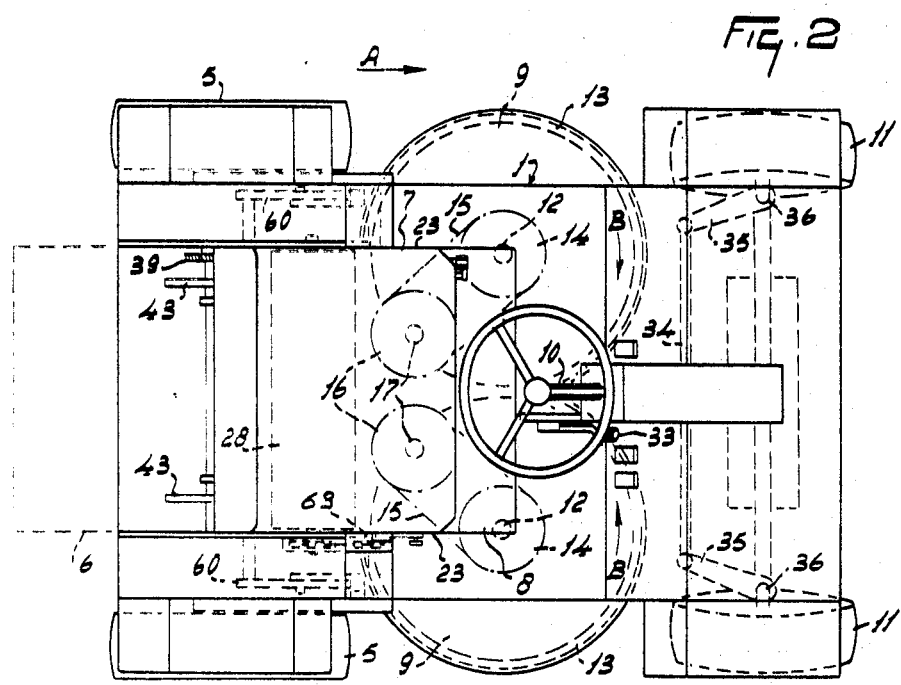
FIG. 2 is a plan view of the device shown in FIG. 1.

The rotary shafts 12 are journalled in a housing 13, which intimately encloses the brush elements on the sides and at the front viewed in the direction of movement A (FIG. 2). On the rear side the elements are not screened over a width corresponding with that of the seat 7 so that the material displaced by the elements can be conducted away rearwardly without being hindered.

The housing 13 is closed on the top side and completely open on the bottom side.

Figure 3:
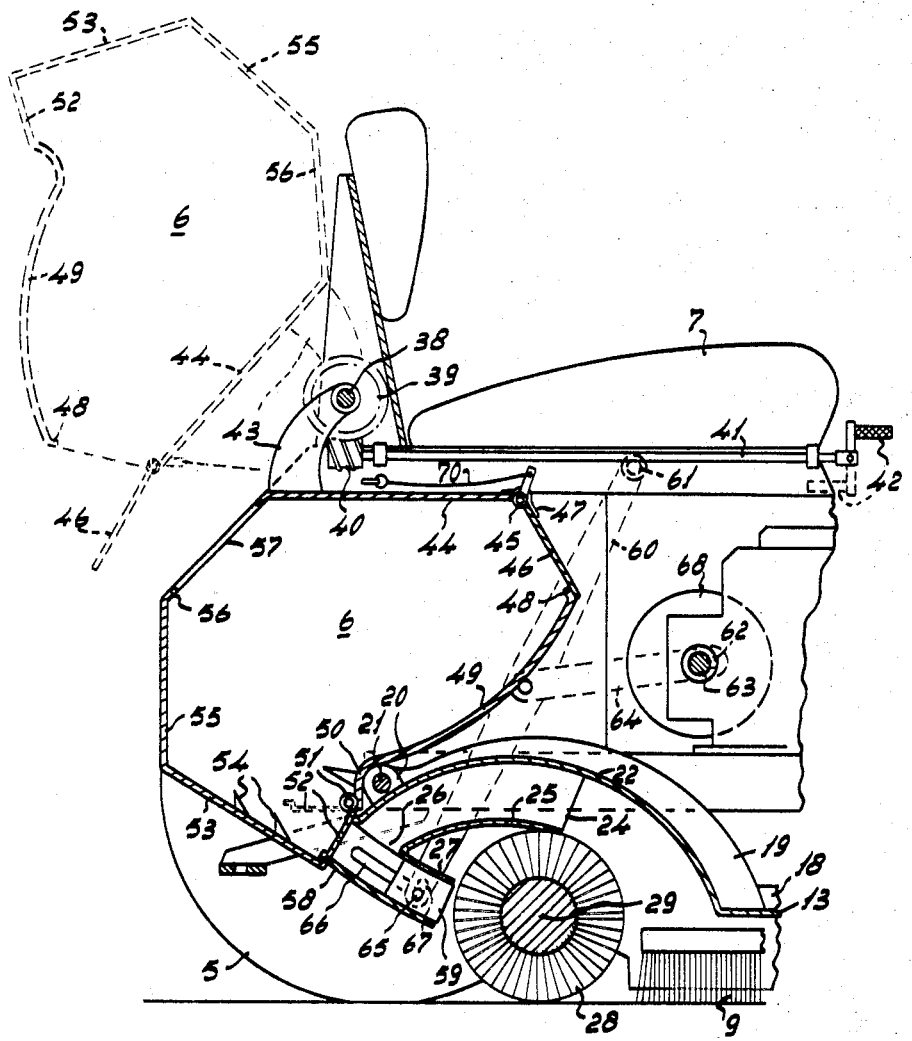
FIG. 3 is a vertical sectional view of the hindmost part of the device shown in FIG. 1 and 2.

Above the housing 13 each of the rotary shafts 12 has a disc 14 adapted to be driven by a belt or a chain. The belts or chains 15 are passed around a pulley 16 adapted to rotate about a shaft 17, parallel to the shafts 12. The shafts 12 and 17 are linked to each other by a frame 18, joining the top side of the housing 13 (FIG. 3) so that they are immovable relatively to each other. The shafts 17 are individually connected with one of the aforesaid outgoing shafts of the engine with the aid of universal joints and auxiliary shafts (not shown) of known type, which are axially extensible. Near the rear side of the housing 13 two steel-sheet extension arms 19 are fastened to the top side of the housing 13 and also to the frame 18, said arms extending away from the housing 13 in rearward and upward direction and, viewed from the ground, having a concave shape (FIG. 3). Near the hindmost end of the extension arms 19 a bearing 20 (FIG. 3) is provided by means of which the extension arms 19, the housing 13, the brush elements 19, the discs 14, 16 and the shafts 12, 17 are capable of turning about a pivotal shaft 21. The center line of the pivotal shaft 21 coincides with that of the rotary axle of the rear wheels 5.

The approximately circular bottom side of the extension arms 19 has fastened to it a steel-sheet partition 22, the width of which is approximately equal to the distance between two vertical boundary walls 23 (FIGS. 1, 2), extending in the direction of movement A at right angles to the shaft 21. When the partition 22 is turned about the pivotal shaft 21, the lateral edges of the partition 22 move along the walls 23 with a slight amount of clearance. This clearance is preferably covered by flexible strips preferably secured to the two lateral ends of the partition 22. The walls 23 are located on each side of the seat 7 and bound at the same time the engine space. On the lower side of the partition 22 are arranged a number of vertical steel-sheet fastening partitions 24, extending in the direction of movement A, said partitions joining by their bottom sides a wall 25, which is spaced apart from the wall 22 by a given distance (FIG. 3). The wall 25 terminates in the same manner near the vertical walls 23 as the partition 22. The space formed between the partitions 22 and 25 is concave, seen from below (see the cross section of FIG. 3) and the larger dimension is at right angles to the direction of movement A. The vertical distance between the walls 22 and 25 decreases rearwardly, because said walls are converging in said direction. The length of the partition 25, measured in the direction of movement A, is approximately half that of the partition 22. The hindmost edges of the partitions 22 and 25 and the two walls 23 bound an approximately rectangular opening 26, the plane of which is at an angle of about 30° to the horizontal plane, whilst the hindmost horizontal edge is at a higher level than the foremost edge.

To the hindmost edge of the partitions 25 is secured a flat wall 27, which is approximately parallel to the plane of the opening and extends forwardly away from the partition 25. The wall 27 has the same width as the partitions 22 and 25 and joins the lateral boundary walls 23 in the same manner.

The free foremost end of the partitions 25 is tangent to the circle formed by the free ends of the wires of a brush 28, located directly behind the brush elements 9 and in front of the trough 6, said brush being adapted to rotate, in operation, about a horizontal shaft 29, extending at right angles to the direction of movement A so that the ends of the brush wires move relatively to the ground in a forward direction. On plan the brush 28 is located approximately between said partitions and its length is approximately equal to the distance between the walls 23.

The front side of the housing 13 is provided with a tag 30 (FIG. 1), to which is pivotally fastened an upwardly extending strip 31. The strip 31 is pivoted to a lever 32. The lever 32 is pivotally arranged on the frame portion 2. The top end 33 has a position such that it is located within the driver's reach.

With the aid of the steering device 10 the front wheels 11 are pivotable through steering rods 34 and 35 in known manner about steering pivot pins 36, located in a vertical plane transverse of the direction of movement A and converging in upward direction. By means of supports 37 the steering pivot pins 36 are fastened to the frame portion 4.

Near the rear side of the seat 7 a pivotal shaft 38 is provided, near one end of which a worm wheel 39 is fastened by keys; it engages a worm 40, which can be turned with the aid of a shaft 41 and a handle 42.

The pivotal shaft 38 has rigidly secured to it supports 43. The length of the shaft 38 is approximately equal to the width of the seat 7. Near each end of the shaft 38 one of the supports 43 is fastened for carrying the collecting trough 6.

The trough 6, located at least partly beneath the seat 7 and having a width of about 1 m, has a horizontal top wall 44, in which a pivotal shaft 45, extending at right angles to the direction of movement, is journalled at the front side; a downwardly and forwardly incline flap 46 is adapted to turn about said shaft. The flap 46 bears under the action of a spring 47 on a stop 48 associated with a wall portion 49. A lever 69 is rigidly secured to the flat 46 and the free end of the lever 69 is coupled by a cable 70 to a fixed point of the device. The wall portion 49 is part of a circle cylinder, the generatrices of which are at right angles to the direction of movement A. The center of the curvature is located on the center line of the shaft 38. The wall portion 49 is arranged so that its bottom end bears freely on the two bearings 20 (FIG. 3). The lower end of the portion 49 terminates in a vertical strip 50, which holds a pivotal shaft 51, about which a flat 52 is adapted to turn. The end of the flap 52 remote from the pivotal shaft 51 may be in contact with a stop associated with the wall 53. Away from said stop the wall 53 extends to the rear in upwardly inclined position, approximately to the plane of the opening 26. Throughout its width the wall 53 has a great number of barbed hooks 54. On the rear side the wall 53 terminates in a vertical rear wall 55, which is joined by a forwardly inclined wall portion 56. The wall portion 56 is fastened to the horizontal wall 44. The wall 56, forming the top portion of the rear side of the trough 6 in the position shown in FIG. 3, is provided with a panel 57 of gauze or a similar material permeable to air. On the sides the trough 6 is closed by two sidewalls joining the walls 44, 49, 50, 53, 55 and 56 and located in the direct proximity of the inner sides of the walls 23.

The two walls 23 are prolonged on the bottom side to the level of the shaft 29. Behind the brush 28 a slightly curved plate 58, extends at right angles to the direction of movement A, is arranged between the walls 23, at least the foremost portion of said plate being spaced apart from and parallel to the wall 27. The hindmost portion extends mainly in line with the wall 53 and joins the same. The space between the walls 27 and 58 accommodates with a large amount of clearance a box-shaped pressing piston 59, located in front of the trough 6. The larger dimension of the pressing piston is at right angles to the direction of movement A and is approximately equal to the distance between the walls 23. The pressing piston 59 can be driven by means of two pivotal arms 60 (FIG. 3), located each on one side of the walls 23, outside thereof, said arms being adapted to turn about horizontal stub shafts 61, extending at right angles to the direction of movement A and located directly beneath the seat 7. Each of the pivotal arms 60 can be driven by means of an eccentric 62, which is adapted to rotate about a shaft 63, extending at right angles to the direction of movement A and driven by the engine. The movements of the eccentrics 62 are transferred by a connecting rod 64, engaging the arm 60 approximately at the centre, to one of the arms 60. The two lateral ends of the pressing piston 59 are provided with horizontal pins 65, extending at right angles to the direction of movement A and projecting through a slot 66 in the walls 23, the arms 60 being adapted to turn about said pins. Each of the pins 65 is adapted to turn in a slot 67 extending in the longitudinal direction of the arm 60.

The shaft 63 is provided with discs 68, about which belts or chains are passed, by means of which the rear wheels 5 and the brush 28 can be driven (FIG. 1).

Figure 4:
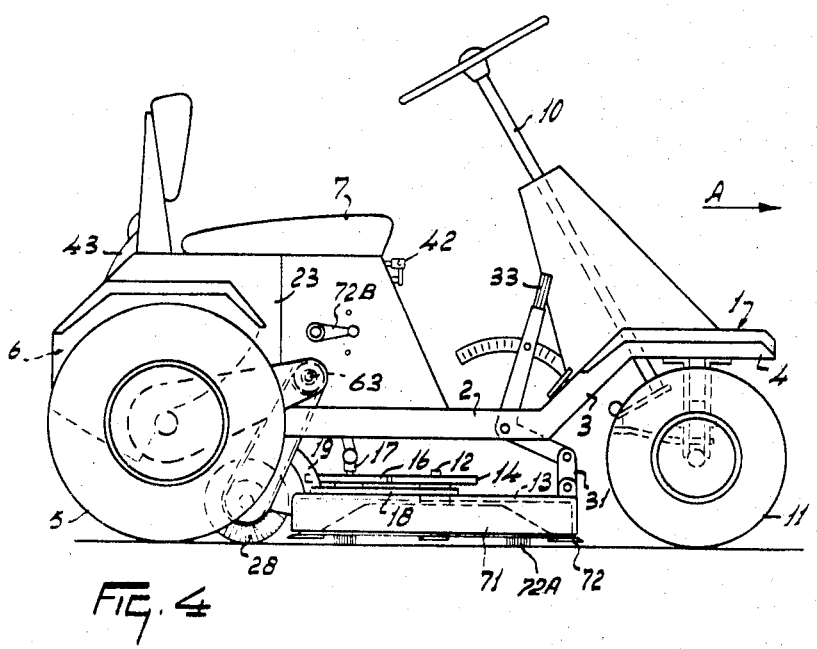
FIG. 4 is a schematic view of a mowing element in the mounted state in a side elevation.
Figure 5:
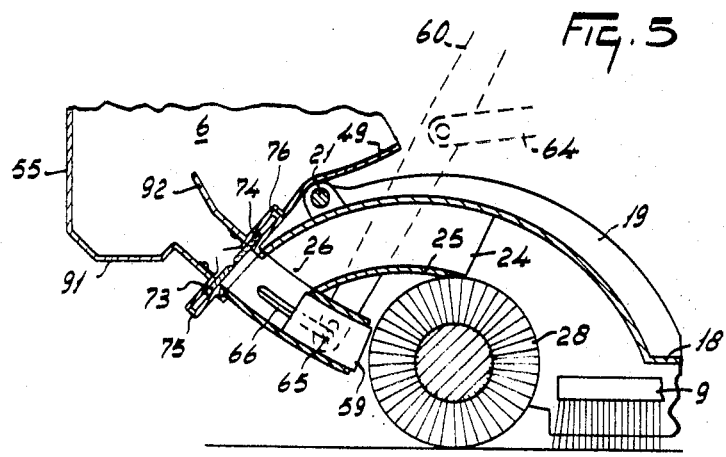
FIG. 5 is a vertical sectional view of the hindmost part of the device in a second embodiment of the invention.

The brush elements 9 have fundamentally the shape of an inverted round box, the brush wires or hairs being fastened to the comparatively broad rim. The elements are secured by a nut inside the box-shaped space to the shaft 12. Instead of brush elements 9 mowing elements can be mounted in the same manner on the shaft 12. FIG. 4 shows schematically a mounted mowing element. The mowing elements comprise a conical drum having four cutters 72 at the free edge on the bottom side. The mowing elements can be constructed so that a group of brushes 72A is fastened between each pair of cutters to the rim of the drum 71. The lower sides of the brushes are located at a lower level than the cutting edges of the cutters 72.

Both the brush elements and the mowing elements can be driven so that the brush hairs or cutters of the two elements, facing each other in operation, move in the rearward direction (arrows B in FIG. 2). By means of a switching lever 72B the speed of rotation of the shafts 17 and 63 can be adapted to the speed required for mowing and brushing. The speed of rotation of the mowing operation is materially higher than that required for brushing (sweeping).

The device shown in FIGS. 1 to 4 operates as follows:

The rear wheels 5 are driven via the belt or chain transmission from the shaft 63. The brushes or cutters rotating in the directions B displace the material lying on a lawn or a road surface (mown grass or soil) so that the material moves rearwardly between the elements. When brushes are joined to the mowing elements, the mown grass is displaced rearwardly by these groups of brushes between the elements. The material thus displaced is thrown against the brush 28 over a given width. The speed of rotation of said brush 28 is such that the material is thrown vigourously into the channel formed between the walls 22, 25 and 23. The material can accumulate in this channel and when the pressing piston 59, driven by the eccentric 62 and the rods 64 and 60 is in the extreme forward position, the material collects in front of the piston. At each rearward stroke of the pressing piston 59 the material is pushed into the trough 6. The material initially located between the plunger 59, occupying the forward position, and the flap 52, will open said flap at each plunger stroke so that the flap turns about the pivotal shaft 51, allowing the material to pass towards the trough 6. The barbed hooks 54 prevent the material already contained in the trough and the material just inserted from shifting back towards the flap 52.

Since the collected material is pushed into the trough 6, the latter can receive a larger quantity of material, so that its capacity is increased. Particularly mown grass, leaves and street soil can be compressed to an extent such that the weight received at a maximum in the trough 6 is considerably higher than is the case in which the material is introduced into the trough without the use of pushing means.

The inserted material is first pushed towards the rear side of the trough 6. In the course of the operation the foremost part will be filled out. The force exerted by the pressing piston 59 on the contents of the trough and hence on the trough 6 tends to turn the trough rearwardly and upwardly about the pivotal shaft 38. This is prevented by the self-braking property of the worm wheel 39 and the worm 40.

The driver can drive the machine backwardly against a container or a collecting pit and empty the trough 6 by turning the trough rearwardly and upwardly by means of the handle 42 and the worm-wheel combination 40, 39 into the position illustrated by broken lines (FIG. 3). Before the trough 6 comes into contact with the rear side of the driver seat 7, the cable 70 is taut so that the flap 46 opens and the material can drop out of the trough 6.

The brush or mowing elements can be displaced in an upward direction. For this purpose the driver has to pull the lever 33 so that the elements, the housing 13, the discs 14, 16, the extension arms 19, the walls 22, 14, 25 and 27 turn upwardly about the pivotal shaft 21 and are then fixable in a plurality of positions. By this turn not only the height of the brush or mowing elements but also the position of the brush elements relative to the ground can be varied. The foremost part of the brush elements, viewed in the direction of movement A, comes into contact with the ground with lesser intensity so that the material, particularly comparatively heavy parts such as stones, will be displaced less rapidly to the inner and rear sides. Owing to the lower centrifugal power said parts are less likely to pass across the brush wires of the adjacent element to beneath said element and to accumulate at said place.

As a matter of course, neither brush elements nor mowing elements need be fastened to the device so that the latter may serve as a vehicle.

A second embodiment of a flap system closing the opening of the trough 6 is illustrated in FIGS. 5 to 8.

The inlet opening of the trough 8 can be closed by two plate-shaped, aligned flat flaps 73 and 74, which are adapted to reciprocate. The flaps 73 and 74 are formed by sheet strips, the larger dimension of which at right angles to the direction of movement A is approximately equal to the distance between the vertical walls 23. In the state in which the flaps close the inlet opening of the trough 6 they are in contact with each other by knife-shaped chamfered edges extending in the direction of the larger dimension. The flaps are parallel to an upwardly inclined plane at an angle of about 45° to the horizontal plane. The flaps 73 and 74 are each movable in a holder 75 and 76 respectively, which are spaced apart (by the size of the inlet opening) by a distance approximately equal to the thickness of the pressing piston 59, measured in the direction of the arm 60. The flaps 73 and 74 are adapted to be moved in the holders 75 and 76 respectively with respect to each other to an extent such that the inlet opening is completely released.

On the two sides each flap 73 and 74 is provided with a pin 79 and 80 respectively (FIG. 6), laterally extending through a slot 77 and 78 respectively in the walls 23.

The pins 79 and 80 are at a comparatively small distance from each other. The flaps 73 and 74 are furthermore provided with tensile springs 81, one end of which is fastened to the flap 73 and the other to the flap 74.

Figure 6:
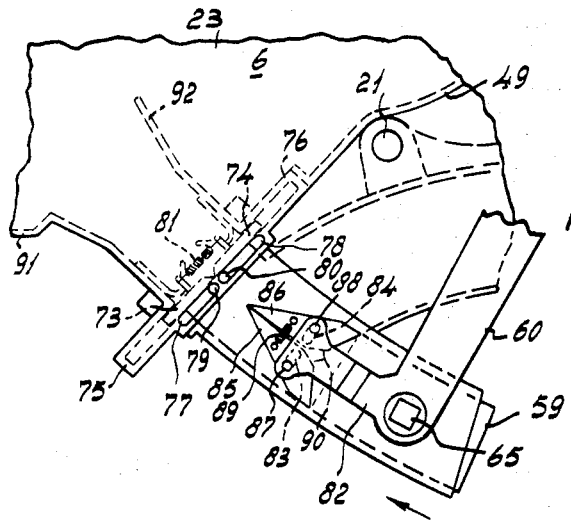
FIG. 6 is a side elevation of the hindmost and bottommost part of the device shown in FIG. 5, a wheel being omitted.

The arms 60, located outside the walls 23, are provided near the pins 65 with an arm 82, extending rearwardly and approximately at right angles to the arm 60 and having two slots 83 and 84 near the hindmost free end, (FIG. 6). The direction of the slots 83 and 84 corresponds with the direction of movement of the flaps 73 and 74. Each arm 82 has movably fastened to it two steering elements 85 and 86. Each steering element comprises a pin 87 and 88 respectively, extending in the associated slot 83 and 84 respectively, so that these steering elements are capable of relatively moving in the direction of the slots 83 and 84 respectively. The steering elements 85 and 86 are coupled with each other by a tensile spring 89. Each steering element (see the elevation of FIG. 6) has two boundary faces converging rearwardly and terminating in a sharp tip. Near the foremost end of each steering element a bevelled face 90 is provided, which converges rearwardly to the center line of the arm 82. The two steering elements are relatively mirror reflections. The contact surface of the two elements 85 and 86 coincides with the center line of the arm 80 in the elevation shown in FIG. 6 and on the side of the arm 60 it terminates in said bevelled face 90.

In this embodiment the shape of the trough 6 is different in that the wall 53 (FIG. 5) has a cavity 91 in downward direction. A wall 92 joins the holder 76 and extends approximately at right angles to the plane to which the flaps 73 and 74 are parallel. The length of the wall 92, viewed from the holder 76, is such that its hindmost end is located approximately perpendicularly above the foremost end of the cavity 91.

This embodiment of the machine operates as follows:

When the arm 60 is turned rearwardly by the eccentric 62, the tip formed by the hindmost ends of the steering elements 85 and 86, held together by the spring 89, penetrates between the pins 79 and 80. Upon a further movement the steering elements push themselves in between these pins and the flaps 73 and 74 are deflected laterally against the action of the spring 81, while the pins 79 and 80 move across the slots 77 and 78 respectively and at the same time along the side faces of the steering elements 85 and 86.

Figure 7:
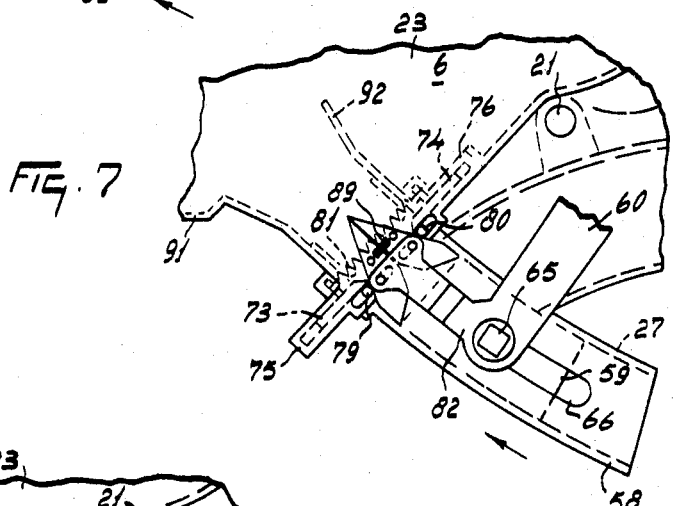
FIG. 7 is an elevation of the parts shown in FIG. 6, the steering members occupying a second position.

The pressing piston 59 pushes the material thrown by the brush 28 through the channel formed between the walls 22 and 25 up to the front of the pressing piston 59 between the opened flaps 73 and 74 into the trough 6 (FIG. 7).

Figure 8:
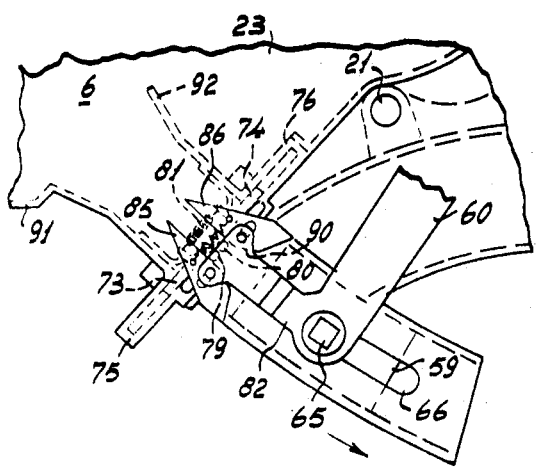
FIG. 8 is an elevation of the parts shown in FIG. 6, the steering members occupying a third position.

The pressing piston 59 moves on rearwardly until its end facing the flaps 73 and 74 is located just in front of said flaps. At this instant the pins 79 and 80 leave the outer faces of the steering elements so that the flaps 73 and 74 approach each other under the action of the spring 81 until their knife-like contact faces touch each other and cut off any residual material. The flaps 73 and 74 close just in front of the face of the pressing piston 59, which has pushed the material into the trough 6 at the instant, when the ram moves back. When the ram 59 moves again forwardly, the pins 79 and 80 are located near such other and are in contact with the bevelled faces 90. As a result, the elements 85 and 86 deflect away from each other against the pressure of the spring 89 and allow the pins 79 and 80 to pass in between (FIG. 8). The elements move forwardly to an extent such that the pins 79 and 80 get out of the space between the deflecting elements, after which the elements approach each other under the action of the spring 89. Subsequently, the same procedure is repeated.

The construction described ensures that each plug of material pushed into the trough is completely received by the trough without the risk of material dropping back out of the trough.

If sand is contained in the material it will drop down due to the vibrations produced at each pressing stroke and it will either be collected in the cavity 91 or get into the space formed by the walls 92 and 49. When the trough 6 is emptied., the collected sand will leave the trough via the flap 46. It is thus prevented that sand flows back along the flaps, for example, through gaps and is collected in course of time between the pressing piston and the walls 27 and 58.

Together with the material the brush 28 displaces a given quantity of air. In order not to disturb the displacement of the material, the channel between the walls 22 and 25 should communicate with the trough 6 so that the air can escape from the trough through the gauze panel 57.

The invention is not restricted to what is stated in the description and/or in the claims, but it also relates to the details of the FIGURES, whether described or not.

What we claim is:

1. A device for picking up and collecting material lying on the ground, comprising a mobile frame and at least one rotatable mowing element mounted on an upwardly extending shaft, said element being positioned below said frame for moving material from the ground, a collecting trough connected to said frame and located to the rear of said mowing element with respect to the normal direction of travel, said trough having an entrance positioned adjacent said mowing element and pushing means located upwardly and rearwardly from said mowing element, said pushing means being located adjacent said entrance to move material upwardly and rearwardly from said entrance into said trough, a driver seat mounted on said frame directly above at least part of said trough.

2. A device as claimed in claim 1, wherein a pick-up brush is located adjacent said entrance and the width of the collecting trough is approximately equal to the length of said pick-up brush.

3. A device as claimed in claim 2, wherein said pushing means comprises a box-shaped pressing piston which reciprocates in a housing that leads to an opening in said trough.

4. A device as claimed in claim 3, wherein said pushing means is driven by an eccentric driving mechanism and said mechanism is positioned in front of said trough.

5. A device as claimed in claim 4, wherein a flap is movable over the entrance and said flap is slideable to open and close the opening.

6. A device as claimed in claim 4, wherein a flap is movable over the entrance and said flap is pivotable to open said opening.

7. A device as claimed in claim 6, wherein said flap is turnable about a horizontal pivot shaft extending transversely of the direction of travel.

8. A device as claimed in claim 7, wherein said flap is turned by material entering said trough.

9. A device as claimed in claim 4, wherein two flaps are mounted to open and close said opening, said flaps cooperating with each other in closed position.

10. A device as claimed in claim 9, wherein said flaps are slidable relative to each other in different directions.

11. A device as claimed in claim 10, wherein said flaps are slideable in opposite directions.

12. A device as claimed in claim 4, wherein at least one flap is movably mounted adjacent said opening, said flap being actuated by the movement of said pushing means during operation.

13. A device as claimed in claim 12, wherein said pushing means is operatively associated with at least one pair of steering elements which are relatively displaceable.

14. A device as claimed in claim 13, wherein said steering elements are displaceable with respect to said pushing means.

15. A device as claimed in claim 14, wherein said steering elements are connected with each other by a spring.

16. A device as claimed in claim 13, wherein there are two flaps which are connected with each other by a spring.

17. A device as claimed in claim 13, wherein said steering elements terminate at one end in a pointed tip.

18. A device as claimed in claim 17, wherein the opposite end of the steering elements each having a surface which is, in elevation, angled to the path described by said pushing means.

19. A device as claimed in claim 18, wherein said steering elements are movable in parallel directions to each other.

20. A device as claimed in claim 1, wherein said mowing element comprises at least one group of brushes mounted for rotation on upright axes.

21. A device as claimed in claim 20, wherein said element has pairs of cutters and at least one group of brushes is provided between each pair of cutters fastened to the mowing element.

22. A device for picking up and collecting material lying on the ground, comprising a mobile frame and a plurality of mowing elements mounted on upwardly extending shafts and said elements being located below said frame for cutting and moving material from the ground, said frame having front and rear wheels and said mowing elements being mounted between said wheels adjacent an entrance which leads into a collecting trough, said collecting trough being positioned to the rear with respect to the normal direction of travel and above said mowing elements, movable pushing means communicating with said entrance and said trough, whereby, material is urged by said pushing means upwardly and rearwardly from said entrance into said trough.

23. A device as claimed in claim 22, wherein said mowing elements are located, viewed in the direction of movement, beneath said collecting trough.

24. A device as claimed in claim 23, wherein the upper aspect of said collecting trough is pivotably connected to said device adjacent a driver seat and turnable into a position behind the driver seat for the discharge of material.

25. A device as claimed in claim 24, wherein said collecting trough is pivotable by an operator from the seat to a discharge position at the rear of said seat.

26. A device as claimed in claim 22, wherein said entrance is in open communication with said collecting trough when the latter is in operative collecting position.

27. A device as claimed in claim 26, wherein a channel leads from said entrance means and a movable flap separates the channel from said trough.

28. A device as claimed in claim 22, wherein said trough is pivotable into a discharge position and separable from said channel.

29. A device for picking up and collecting material lying on the ground, comprising a mobile frame and at least one rotatable mowing element mounted to extend below said frame for cutting and mowing material from the ground, a collecting trough connected to said frame and located to the rear of said mowing element with respect to the normal direction of travel, said trough having entrance means leading to the interior of said trough, said entrance means being positioned adjacent said mowing element and movable pushing means in a housing being located near said entrance means to receive material from said mowing element and force the picked up material upwardly and rearwardly from said mowing element and said entrance means into said collecting trough, said housing and pushing means being positioned to move the material substantially parallel to the normal direction of travel.

30. A device as claimed in claim 29, wherein said pushing means is periodically reciprocable to compress the material in said trough during operation.

31. A device as claimed in claim 29, wherein said mowing element is releasably connected on said device.

32. A device as claimed in claim 29, wherein, viewed in the direction of travel of the device, a pick-up brush is rotatably mounted immediately behind the mower element.

33. A device as claimed in claim 32, wherein said pick-up brush is rotatable about a horizontal shaft journalled to said frame and extending transversely of the direction of travel.

34. A device as claimed in claim 33, wherein the ends of the pick-up brush filaments are movable along the ground in a forward direction.

35. A device as claimed in claim 32, wherein a conveyor channel is supported from said frame adjacent said entrance means to receive picked-up material from said pick-up brush.

36. A device as claimed in claim 35, wherein said conveyor channel extends rearwardly from said pick-up brush to said collecting trough supported to the rear of the pick-up brush.

37. A device as claimed in claim 36, wrhein said conveyor channel is curved in shape when viewed from the side and said housing with pushing means is located below said channel.

38. A device as claimed in claim 35, wherein said pushing means and channel extend approximately throughout the length of said pick-up brush.

39. A device as claimed in claim 35, wherein said conveyor channel terminates near an inlet opening to said collecting trough, said opening being closed by movable flap means.

40. A device as claimed in claim 39, wherein a driver seat is mounted on the frame and the collecting trough is located at least partly beneath the seat.

* * * * *